Sept. 18, 1928.
T. C. HOLLNAGEL
1,684,673
TRUCK
Filed March 26, 1923
3 Sheets-Sheet 1
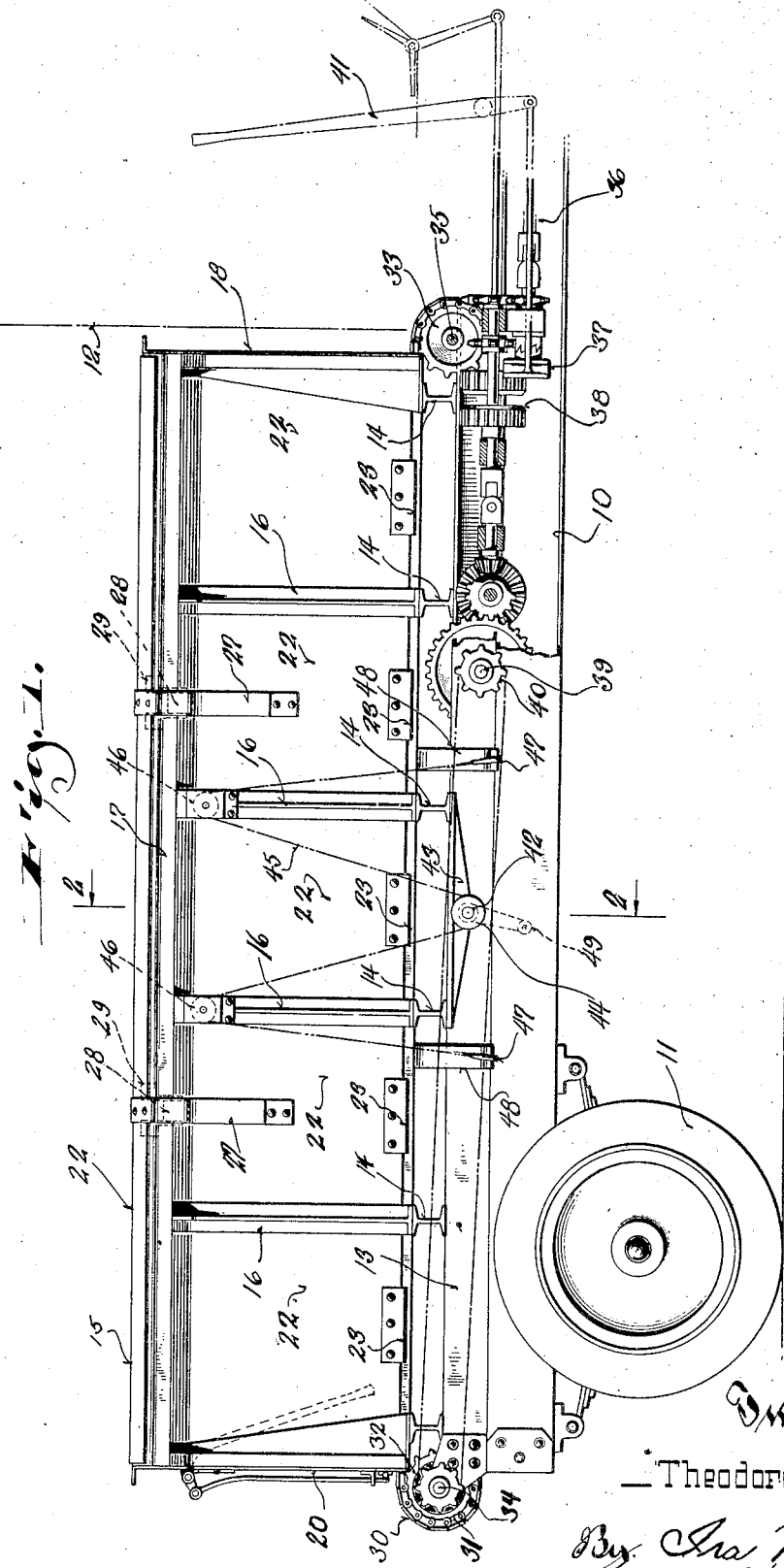
Inventor
Theodore C. Hollnagel
By Ira M. Jones
Attorney Sept. 18, 1928.  T. C. HOLLNAGEL  1,684,673
TRUCK
Filed March 26, 1923    3 Sheets-Sheet 2
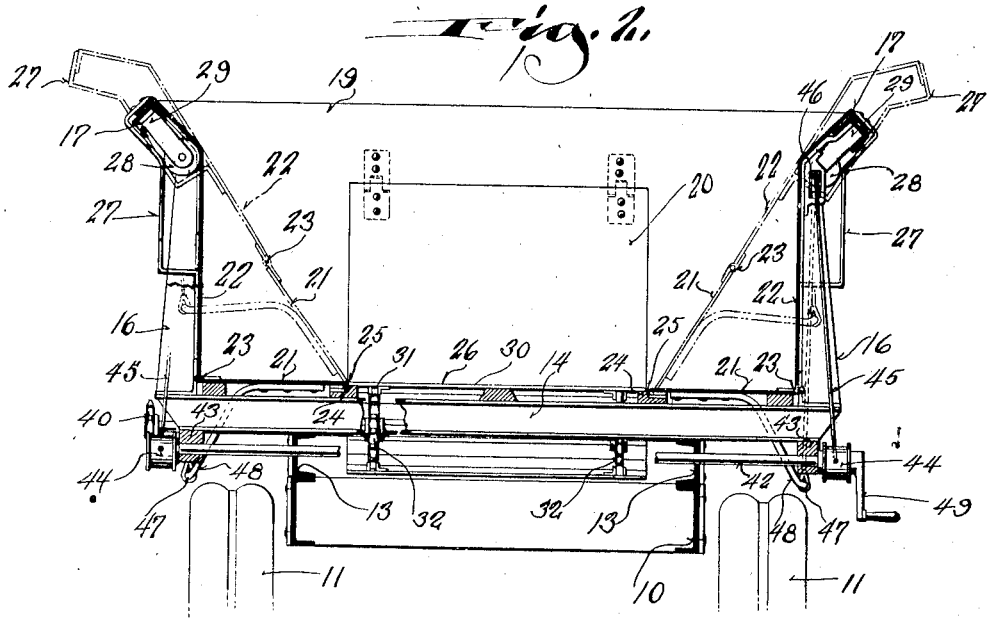
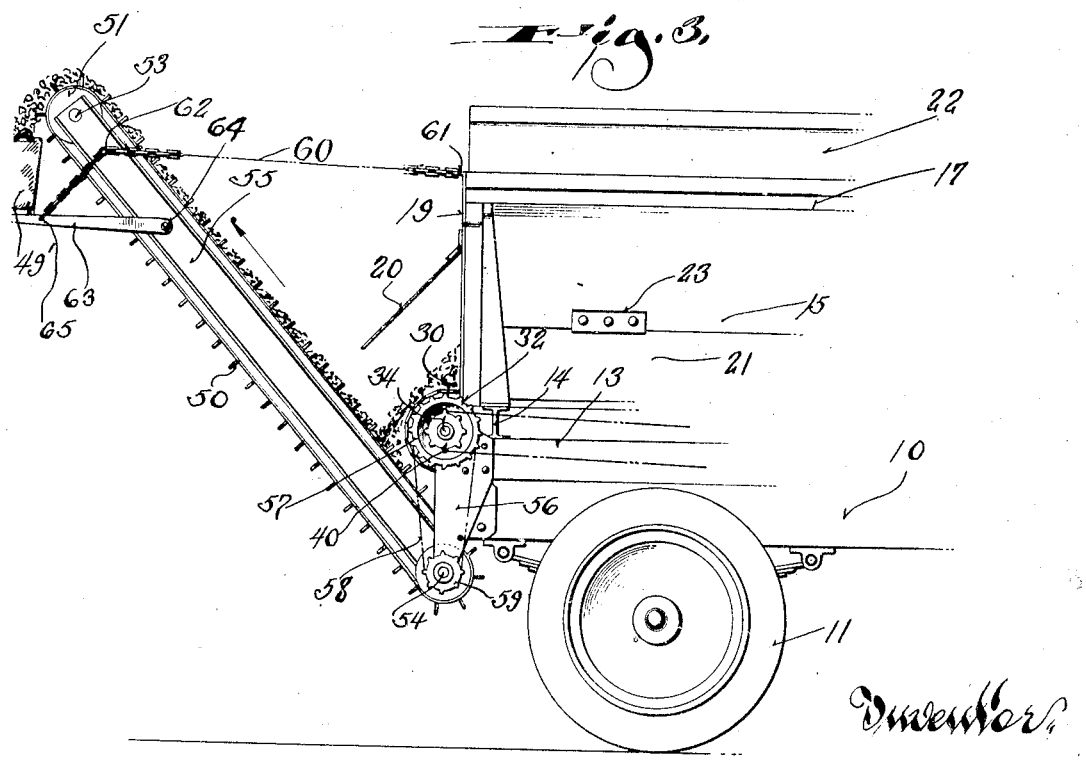
Theodore C. Hollnagel Sept. 18, 1928.

T. C. HOLLNAGEL 1,684,673

TRUCK

Filed March 26, 1923    3 Sheets-Sheet 3

Inventor

Theodore C. Hollnagel

By Ira M. Jones

Attorney

Patented Sept. 18, 1928.

1,684,673

UNITED STATES PATENT OFFICE.

THEODORE C. HOLLNAGEL, OF MILWAUKEE, WISCONSIN, ASSIGNOR, BY MESNE ASSIGNMENTS, TO THE HUGHES-KEENAN COMPANY, OF MANSFIELD, OHIO, A CORPORATION OF OHIO.

TRUCK.

Application filed March 26, 1923. Serial No. 627,895.

This invention relates to certain new and useful improvements in trucks and refers more particularly to an unloading device for trucks, freight cars or the like.

In that form of unloading device illustrated in my co-pending application filed June 19, 1922, Serial No. 569,516, the entire floor of the truck load receiving body is movable and while the same operates in a highly desirable manner, it requires an excess of energy to bodily shift the entire load in the body. Therefore, it is an object of this invention to provide an unloading device of the movable floor type which requires a minimum of power for its operation.

It is another object of this invention to provide a load receiving body having adjustable side walls adapted to be inclined toward a discharging device during the unloading operation to insure the complete discharge of the body load and at the same time permit maximum load capacity when the walls are in normal position.

A further object of this invention is to provide an attachment for unloading devices whereing the material may be readily discharged into buckets, sacks or other containers at approximately shoulder height in order to facilitate the carrying of the material from the body to a place of storage.

A still further object of this invention is to provide a device of the character described which may be either manually or mechanically operated, which may be applied to the trucks now in use or to the trucks at the time of their manufacture, and which is applicable to wagons, trucks, railway cars and the like.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side view of an automotive truck equipped with my invention, parts thereof being broken away and in section to illustrate details of construction;

Figure 2 is a view, partly in section and partly in elevation, taken through Figure 1 on the plane of the line 2—2;

Figure 3 is a side view of the rear or discharge end of the truck body illustrating means for conveying the material upwardly to a bucket or receptacle receiving platform to facilitate its ready conveyance to a place of storage;

Figure 4 is a side view, partly in section and partly in elevation, illustrating the application of the principles of my invention to a railway car;

Figure 5, is a fragmentary view, partly in section and partly in elevation, taken through Figure 4 on the plane of line 5—5;

Figure 6 is an enlarged fragmentary sectional view illustrating the manner of securing the discharge gates of that form of my invention depicted in Figure 4 in either closed or open position, and Figure 7 is a fragmentary perspective view illustrating a manual means for actuating the movable floor or bottom of the car.

Referring now more particularly to the accompanying drawings in which like numerals designate like parts throughout the several views, the numeral 10 designates the chassis frame of an automotive truck which is supported at its rear by drive wheels 11 and at its forward end by steering wheels, not shown. Mounted on the chassis frame rearwardly of the power unit, not shown, and the driver's cab 12, illustrated by conventional lines, is a load receiving body supporting frame comprising longitudinal side channel beams or sills 13 suitably secured to the chassis frame and carrying, at spaced intervals, transverse bars or I-beams 14 upon which is mounted a load receiving body 15.

The load receiving body is constructed of a plurality of spaced vertical beams or braces 16 having their lower ends secured to the transverse beams 14 and their upper ends connected by channel irons, or other connecting members, 17 to thus provide a rigid body frame which is closed at its inner end by an end plate 18 and at its outer discharge end by an end plate 19 provided with a hinged discharge gate 20. The sides of the body each comprise a pair of members or plates 21 and 22 hingedly connected, as at 23, plate 21 extending throughout the length of the body and having its longitudinal edge pivotally connected to a longitudinal beam 24 fixed to the beams 14, as at 25, near the adjacent side of a movable floor member 26, to be later described.

Each plate or member 22 is of a width approximately equal to the height of the body frame and has its outer portion inclined outwardly and then laterally to, with a bracket member 27, provide a track for a roller 28 journaled in a bracket 29 fixed to the adjacent channel iron 17. Roller 28 prevents the falling inwardly of the sides when in load receiving position and provides anti-friction means for supporting the weight of the sides when moved to the dotted line position depicted in Figure 2. Each plate 22 is preferably provided with two or more bracket members 27 as illustrated in Figure 1. When the body is in load receiving condition, the wall sections are in the full line positions depicted in Figure 2 with the outer ends of the tracks formed by brackets 27 and the adjacent portions of the plates nested on the channel irons 17, and the point of connection between the plates 21 and 22 forming an angle to define the junction of the body sides and bottom.

Each hinge 23 has its part secured to the plate 21 on the inner face thereof and its part secured to the plate 22 on the outer face thereof, whereby the inner edges of the plates 22 are tight with and overlap the plates 21 as illustrated by the full lines in Figure 2. This hinge construction also prevents inward movement of the side walls beyond the straight line formed by their dotted line positions in Figure 2.

As before described, and clearly illustrated in Figure 2, the plates 21 form but a portion of the floor or bottom of the body and have their inner longitudinal ends spaced to accommodate the movable or endless floor member 26. Member 26 comprises a plurality of slats or transverse plates 30 carried by links 31 of a pair of sprocket chains trained about sprocket wheels 32 and 33 mounted on shafts 34 and 35, journaled in bearings disposed adjacent the rear and forward ends of the sills 13.

One of the shafts mounting the endless floor sprockets is adapted to be driven by either manual or mechanical means to move the upper face of the endless floor portion toward the gate 20 to discharge the load and in the drawings a shaft 36 is connectable, by a clutch mechanism 37, with the truck power plant, not shown, to drive one of the sprocket shafts through a gear transmission 38 connected with a driven shaft 39 which is in turn connected with one of the sprocket shafts through a sprocket chain or other suitable connection 40. A control device 41 is preferably located in the driver's cab 12, at a point convenient to the driver's seat, for connecting and disconnecting the drive of the unloading device.

As best shown in Figure 2, the discharge gate 20 is preferably of a width substantially equal to that of the movable floor portion and as the load is discharged from the body the movable side walls are adjusted to their dotted line positions to insure the complete emptying of the body. The side walls are adjusted by a shaft 42 mounted transversely of the body in bearings 43 secured to the center main beams 14 and having drums 44 secured to the ends thereof, each drum having the medial portion of a cable 45 secured thereto, the ends of which pass over guide pulleys 46, secured to the upper portions of the adjacent braces 16, and then downwardly and are secured, as at 47, to levers or arms 48 rigidly attached to the under side of the adjacent plates or sections 21. With this construction it will be readily obvious that rotation of shaft 42, through the medium of a hand crank 49 or any other suitable mechanism, winds the medial portions of the cables 45 on the drums 44 shortening the cables and straightening the angle between the plates 21 and 22 to incline the side walls toward the movable floor portion 26. In this manner all of the material is placed on the movable floor and thus readily discharged from the body.

In handling coal, coke or other material, it is desirable to discharge the material directly into buckets, bags or other containers 49' for convenience in carrying it to a place of storage such as the basement of a residence and in Figure 3 I have illustrated an attachment for conveying the material as it is discharged from gate 20 and to a receptacle supporting platform of approximately shoulder height. If desired the conveyor 50 may be employed to convey the material directly to a place of storage or else have a chute, not shown, attached thereto for carrying the material to a manhole, basement window, or the like.

In this form of my invention an endless conveyer 50 of preferably the belt type having flights secured thereto, is trained about pulleys 51 and 52 mounted on shafts 53 and 54 journaled in the ends of a frame 55 secured to the truck by the shaft 54 which is journaled in brackets or supports 56 depending from the rear ends of the sills 13. The conveyer 50 is driven from a sprocket wheel 57 fixed to shaft 34 by a sprocket chain or belt 58 trained about a sprocket wheel 59 fixed to shaft 54. The frame 55 is secured at the proper angle by chain or other brace means 60 having its inner ends or end secured to the body, as at 61, and its outer end or ends secured at the frame 55, as at 62, a platform 63 for receiving the receptacles 49' being secured to the frame, as at 64, and braced by a chain or other means 65.

In Figures 4 to 7, inclusive, I have illustrated the application of the principle of my invention to a railway car of either the open or closed type in which two movable floor units 26 are provided adapted to discharge toward the center of the car into suitable discharge chutes and as the construction of this form of my invention is identical with that illustrated in Figures 1 to 3 with a few additions the description of Figures 1 to 3 it is thought will suffice for Figures 4 to 7, with the following additions.

The central portions 66 of the side walls of the car are rigid and the portions of the side walls outwardly thereof are adjustable as previously described in connection with the truck device, and mounted between the inner ends of the pairs of plates 21 in each end of the car is a movable floor device 26, the movable floor device discharging into an opening 67 between the fixed walls 66 from which a two-way spout construction 68 leads for discharging the load to either side.

The discharge spout is in the form of a trough having a discharge mouth 69 adjacent each side of the car and hingedly connected to a common shaft 70 are a pair of gate members 71, which, when in their positions illustrated in Figures 4 and 6, close the opening 67. Each gate member 71 has a lock or latch device 72 secured to its outer end for engagement in an opening or keeper 73, in the adjacent portion of the fixed walls 66 defining the sides of opening 67, when the gate is closed and which passes through an opening 74 in the bottom of the adjacent chute 69 when open, as illustrated in Figure 6.

In this form of my invention I have illustrated manual means for operating the movable floor members comprising a shaft 75 journaled between the center-most transverse beams 14 and carrying beveled gears 76 which mesh with beveled gears 77 mounted on the inner-most shafts 34 of the movable floors, shaft 75 being rotatable by a ratchet lever 78 as illustrated in Figure 7, a pulley 79 being provided on the shaft 75 in the event it is desired to connect a suitable power unit therewith for mechanical operation.

In the event it is desired to elevate the material from either discharge spout 69 to a truck or place of storage, a conveyer similar to that depicted in Figure 3 may be employed, but a portion of the conveyer being illustrated by conventional lines.

From the above description taken in connection with the accompanying drawings it will be readily apparent to those skilled in the art to which an invention of this character appertains, that I provide means for discharging the load from a truck car body or the like which will greatly facilitate the handling of the material and at the same time in nowise decrease the carrying capacity of the body.

What I claim as my invention is:

1. A load receiving body, comprising a pair of floor members, means hingedly connecting the inner edges of the floor members with the body, a pair of side members, means hingedly connecting one side member with each floor member, and means positioned outside of the body operable to move the floor and said members to form side walls inclined toward the medial portion of the body.

2. A load receiving body, comprising a body frame, a conveyer mounted in the frame, a floor member having its inner edge connected with the frame adjacent the conveyer, a side wall member having its inner edge connected with the outer edge of the floor member, the floor and side wall members being normally disposed at an angle to give the body a maximum load carrying capacity, and means operable on the floor member and positioned on the outside of the body frame for straightening the angle between the floor and wall members to cause the material in the body to one side of the conveyer to be discharged on the conveyer.

3. A load receiving body, comprising a body frame, a conveyer mounted in the frame, a floor member having its inner edge pivotally connected with the frame adjacent the conveyer, a side wall member having its inner edge pivotally connected with the outer edge of the floor member, the floor and side wall members being normally disposed at an angle to give the body a maximum load carrying capacity, and means positioned outside of the body frame for straightening the angle between the floor and wall members to cause the material in the body to one side of the conveyer to be discharged on the conveyer.

4. A load receiving body, comprising a body frame, a conveyer mounted in the frame, a floor member having its inner edge pivotally connected with the frame adjacent the conveyer, a side wall member having its inner edge pivotally connected with the outer edge of the floor member, the floor and side wall members being normally disposed at an angle to each other to give the body a maximum load carrying capacity, a lever secured to the underside of said floor member, and means connected with said lever to raise the same and straighten the angle between the said members to provide a side wall inclined to said conveyer for insuring the complete discharge of the material from the body.

5. A load receiving body, comprising a body frame, an endless conveyer longitudinally mounted in the frame, floor members mounted on the frame and one to each side of said conveyer, the upper tread of the conveyer and said floor members forming the body floor, means pivotally connecting the inner edges of said floor members with the body frame, side wall members having their inner edges secured to the outer edges of the adjacent floor members and normally disposed at angles thereto to provide maximum load receiving capacity, means positioned outside of the body frame for straightening the angle between said members to form side walls inclined downwardly and inwardly toward said conveyer, and means preventing inward movement of said side members when in normal position.

6. A load receiving body, comprising a body frame, an endless conveyer longitudinally mounted in the frame, floor members mounted on the frame and one to each side of said conveyer, the upper tread of the conveyer and said floor members forming the body floor, means pivotally connecting the inner edges of said floor members with the body frame, side wall members having their inner edges secured to the outer edges of the adjacent floor members and normally disposed at angles thereto to provide maximum load receiving capacity, means for straightening the angle between said members to form side walls inclined downwardly and inwardly toward said conveyer, and antifriction rollers supporting the weight of the side wall members during straightening movement of the angle between them and said floor members.

7. A load receiving body, comprising a body frame, an endless conveyer longitudinally mounted in the frame, floor members mounted on the frame and one to each side of said conveyer, the upper tread of the conveyer and said floor members forming the body floor, means pivotally connecting the inner edges of said floor members with the body frame, side wall members having their inner edges secured to the outer edges of the adjacent floor members and normally disposed at angles thereto to provide maximum load receiving capacity, means for straightening the angle between said members to form side walls inclined donwardly and inwardly toward said conveyer, antifriction rollers supporting the weight of the side wall members during straightening movement of the angle between them and said floor members, and means engageable with said anti-friction rollers to prevent the inward movement of the side wall members when in normal position.

In testimony whereof I affix my signature.

THEODORE C. HOLLNAGEL.